United States Patent Office 3,455,907
Patented July 15, 1969

3,455,907
PROCESS AND INTERMEDIATES FOR THE MANU-
FACTURE OF 3-KETO-17-KETAL STEROIDS
Hugh L. Dryden, Jr., Deerfield, and Gayle M. Webber,
Wilmette, Ill., assignors to G. D. Searle & Co., Chicago,
Ill., a corporation of Delaware
No Drawing. Filed Mar. 2, 1967, Ser. No. 619,914
Claims priority, application Great Britain, Mar. 7, 1966,
9,787/66
Int. Cl. C07c 167/10, 169/10, 167/00
U.S. Cl. 260—239.5
8 Claims

ABSTRACT OF THE DISCLOSURE

A process for the selective hydrolysis of the enamine function of novel steroidal enamine-ketals involving the use of an amine complexing agent, e.g. boric acid or an alkyl borate, thus affording estr-4-ene-3,17-dione 17-ketals, which are converted to known pharmacologically useful steroids. The emamine-ketal intermediates themselves are useful also as pharmacological agents, e.g. as hypocholesterolemic, estrogenic, anti-fungal, mono- and dicotyledonous seed germination inhibitory and anthelmintic agents.

The present invention relates to a novel process for the manufacture of 3-keto-17-ketal steroids and to novel intermediates utilized in that process. Those novel intermediates are specifically illustrated by the following general structural formula

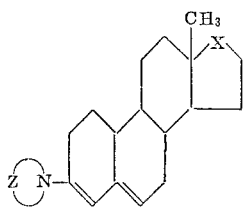

wherein

represents the residue of a heterocycloaliphatic amine such as pyrrolidine, piperidine or morpholine; and X is a dialkoxymethylene or alkylenedioxymethylene function.

The alkoxy groups encompassed by the X term in the foregoing structural representation are typified by methoxy, ethoxy, propoxy, butoxy, pentyloxy, hexyloxy, heptyloxy and the branched-chain radicals isomeric therewith.

The alkylene radicals included within the X term are exemplified by ethylene, trimethylene, tetramethylene and the branched-chain isomers thereof.

The success of the instant novel process is attributable to the surprising discovery that the enamine function of the instant enamine-ketal intermediates can be selectively and completely removed without affecting the ketal function. That cleavage is accomplished by selective hydrolysis in neutral or alkaline medium in the presence of a suitable complexing agent, which unexpectedly combines with the liberated amine to prevent reformation of the enamine function. Preferred complexing agents are boric acid and alkyl borates, e.g., methyl borate. The process is preferably carried out until complete solution of the steroid occurs. If the reaction is carried out for a longer period of time, it is desirable that alkali be present to avoid subsequent hydrolysis of the ketal function. Although the reaction may be carried out without the use of heat, it has been found that heat serves to promote the reaction.

A preferred procedure for this selective hydrolysis is illustrated by the heating of 3-pyrrolidinoestra-3,5-dien-17-one 17-dimethyl ketal in aqueous methanol with potassium hydroxide and boric acid, thus affording estr-4-ene-3,17-dione 17-dimethyl ketal.

The instant novel process can be advantageously employed in reaction schemes utilized in the preparation of known pharmacologically useful steroids, for example in the preparation of 17-α-ethynylestr-4-ene-3β,17β-diol which, as is described in U.S. Patent 2,843,609, is a progestational agent. Thus, in such a scheme, conversion of the 3-keto group of the latter 3,17-dione 17-ketals to a hydroxy function while maintaining the ketal function intact is conveniently accomplished by reaction with a suitable reducing agent in neutral or alkaline medium. Reducing agents suitable for that purpose are metallic hydrides typified by sodium borohydride, potassium borohydride, lithium aluminum hydride, lithium tri-(tertiary-butoxy) aluminum hydride and diisobutyl aluminum hydride. Reaction of estr-4-ene-3,17-dione 17-dimethyl ketal with diisobutyl aluminum hydride in tetrahydrofuran-hexane solution at low temperature affords an isomeric mixture strongly predominant in the 3β-hydroxy isomer. Fractional crystallization of that mixture results in the isolation of pure 3β-hydroxyestr-4-en-17-one 17-dimethyl ketal.

Removal of the 17-ketal function of the latter compounds is preferably achieved by reaction at or near room temperature with a weakly acidic reagent. The aforementioned 3β-hydroxyestr-4-en-17-one 17-dimethyl ketal is thus stirred with acetic acid in aqueous methanol at room temperature to yield 3β-hydroxyestr-4-en-17-one. The latter substance can be ethynylated to afford the desired 17α-ethynylestr-4-ene-3β,17β-diol, described above.

The novel intermediates employed in the instant novel procedure can be prepared conveniently by utilizing as starting materials estrene-3,17-diones of the following structural formula

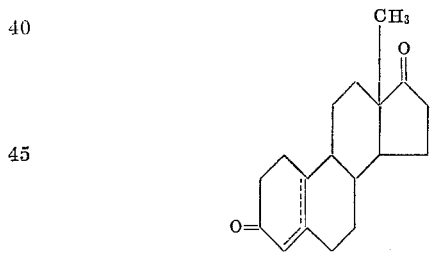

wherein the dotted line indicates that the double bond is optionally at the 4(5) or 5(10) position. The corresponding enamines of the following formula

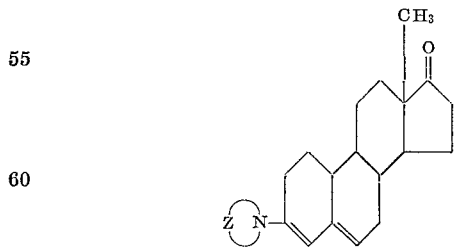

are produced by heating a diketo starting material with the appropriate heterocycloaliphatic amine, optionally in the presence of an acid catalyst. As a specific example, estr-5(10)-ene-3,17-dione and pyrrolidine are heated in methanol solution, thus producing 3-pyrrolidinoestra-3,5-dien-17-one. A second example of that procedure is the reaction of estr-4-ene-3,17-dione with morpholine and a catalytic quantity of p-toluenesulfonic acid in heptane solution to yield 3-morpholinoestra-3,5-dien-17-one.

Ketalization of the 17-keto group contained in the latter enamines is suitably effected by reaction with the appropriate alkanol or glycol in the presence of a trialkyl orthoformate and an acid catalyst to afford the instant novel intermediates. Thus, for example, the aforementioned 3-pyrrolidinoestra-3,5-dien-17-one is contacted with methanol, trimethyl orthoformate and concentrated sulfuric acid to produce 3-pyrrolidinoestra-3,5-dien-17-one 17-dimethyl ketal. The reaction of 3-piperidinoestra-3,5-dien-17-one with ethylene glycol, trimethyl orthoformate and sulfuric acid, in a similar manner, provides 3-piperidinoestra-3,5-dien-17-one 17-ethylene ketal. These isolated intermediates are then subjected to the novel hydrolysis procedure described above; alternatively, the ketalization mixture containing the enamine-ketal intermediates can be hydrolyzed directly, in accord with the novel procedure described hereinabove, to afford the corresponding 3-keto-17-ketals.

The novel intermediates of this invention display valuable pharmacological properties also. They are hypocholesterolemic agents, for example, and, furthermore, exhibit minimal estrogenic activity. In addition, they are anti-fungal agents as evidenced by their ability to inhibit the growth of such microorganisms as *Trichophyton mentagrophytes* and *Candida albicans,* anthelmintic agents as indicated by their ability to destroy parasitic trematodes such as *Schistosoma mansoni* and inhibitors of mono- and dicotyledonous seed germination.

The invention will appear more fully from the examples which follow. These examples are given by way of illustration only and are not to be construed as limiting the invention either in spirit or in scope as many modifications both in materials and methods will be apparent from this disclosure to those skilled in the art. Quantities of materials are given in parts by weight except where otherwise noted and temperatures are recited in degrees centigrade (° C.).

EXAMPLE 1

Method A

A mixture of 100 parts of estr-5(10)-ene-3,17-dione and 400 parts of methanol is heated, in a nitrogen atmosphere to effect solution, after which time 34.1 parts of pyrrolidine is added dropwise over a period of about 5 minutes. The rate of addition is controlled so that gentle refluxing is maintained. After completion of the addition, the reaction mixture is stirred for about 15 minutes, then cooled to approximately 5° and stirred at that temperature for approximately 90 minutes. The resulting crystalline product is collected by filtration and washed on the filter with ice-cold methanol to afford 3-pyrrolidinoestra-3,5-dien-17-one, melting at about 195–200° with decomposition.

Method B 3-pyrrolidinoestra-3,5-dien-17-one is obtained alternatively by substituting an equivalent quantity of estr-4-ene-3,17-dione in the latter procedure.

EXAMPLE 2

A mixture of 1 part of estr-4-ene-3,17-dione, 0.1 part of p-toluenesulfonic acid monohydrate, 1.72 parts of piperdine and 14 parts of octane is heated with stirring for about 3 hours, during which time the water of reaction is removed mechanically. The reaction mixture is then cooled and evaporated to dryness under reduced pressure to afford the crude product. Recrystallization from acetone yields pure 3-piperidinoestra-3,5-dien-17-one, melting at about 149–151°.

EXAMPLE 3

A mixture containing 1 part of estr-4-ene-3,17-dione, 2.5 parts of morpholine, 0.01 part of p-toluenesulfonic acid and 9.5 parts of heptane is heated at the reflux temperature for about 3 hours while the water of reaction is mechanically removed. The volatile materials are then removed by distillation under reduced pressure, and the resulting residue is purified by recrystallization from acetone to yield 3-morpholinoestra-3,5-dien-17-one, melting at about 175–178°.

EXAMPLE 4

To a mixture of 117 parts of 3-pyrrolidinoestra-3,5-dien-17-one with 800 parts of methanol, in a nitrogen atmosphere, is added successively 79.5 parts of trimethyl orthoformate and 44.2 parts of concentrated sulfuric acid with stirring. The addition of acid results in an exothermic reaction and the mixture becomes homogeneous. This warm mixture is then stirred for about 15 minutes longer, following which time 112 parts of tetramethylguanidine is added. The latter addition results in an exothermic reaction accompanied by separation of the crude product. The slurry thus produced is filtered, and the filter cake is washed several times with methanol, then dried to afford 3-pyrrolidinoestra-3,5-dien-17-one 17-dimethyl ketal, melting at about 140–143° and represented by the following structural formula

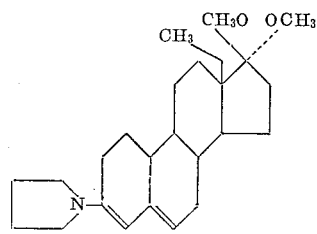

EXAMPLE 5

By substituting an equivalent quantity of 3-piperidinoestra-3,5-dien-17-one and otherwise proceeding according to the processes described in Example 4, there is produced 3-piperidinoestra-3,5-dien - 17 - one 17 - dimethyl ketal which, after recrystallization from tetrahydrofuran-methanol, melts at about 127–128°. This compound displays an optical rotation of −87° and is represented by the following structural formula

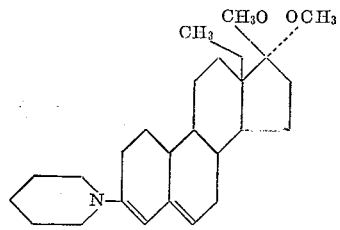

EXAMPLE 6

The substitution of an equivalent quantity of 3-morpholinoestra-3,5-dien-17-one in the procedure of Example 4 results in 3-morpholinoestra-3,5-dien - 17 - one 17 - dimethyl ketal which, after recrystallization from tetrahydrofuran-methanol melts at about 170–172°. It exhibits an optical rotation of −70.5° and is represented by the following structural formula

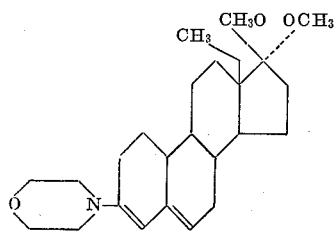

EXAMPLE 7

The substitution of equivalent quantities of ethanol and triethyl orthoformate in the procedure of Example 4 results in 3-pyrrolidinoestra-3,5-dien-17-one 17-diethyl ketal which, after recrystallization from tetrahydrofuran-ethanol, melts at about 195–200° and exhibits an optical rotation of −76.5°.

EXAMPLE 8

The reaction of equivalent quantities of 3-piperidinoestra-3,5-dien-17-one, ethanol and triethyl orthoformate according to the procedure of Example 4 results in 3-piperidinoestra-3,5-dien-17-one 17-diethyl ketal, which displays a melting point at about 129–132° and an optical rotation of −73.5°.

EXAMPLE 9

The reaction of equivalent quantities of 3-morpholinoestra-3,5-dien-17-one, ethanol and triethyl orthoformate by the procedure described in Example 4 results in 3-morpholinoestra-3,5-dien-17-one 17-diethyl ketal which, after recrystallization from cyclohexane, melts at about 193–196° and exhibits an optical rotation of −96°

EXAMPLE 10

A mixture containing 1 part of 3-piperidinoestra-3,5-dien-17-one, 1 part of trimethyl orthoformate, 2 parts of ethylene glycol, 4 parts of methanol and 0.37 part of concentrated sulfuric acid is stirred in a nitrogen atmosphere for about 15 minutes, whereupon 0.91 part of tetramethylguanidine is added. The crude product which crystallizes from the reaction mixture at that point is removed by filtration, washed on the filter with methanol and purified by recrystallization from tetrahydrofuran-methanol to yield 3-piperidinoestra-3,5-dien-17-one 17-ethylene ketal, melting at about 109–112° and displaying an optical rotation of −94°.

EXAMPLE 11

The substitution of an equivalent quantity of 3-pyrrolidinoestra-3,5-dien-17-one in the procedure of Example 10 results in 3-pyrrolidinoestra-3,5-dien-17-one 17-ethylene ketal, melting at about 133–135° and displaying an optical rotation of −123°.

EXAMPLE 12

By substituting an equivalent quantity of 3-morpholinoestra-3,5-dien-17-one and otherwise proceeding according to the processes of Example 10, there is obtained 3-morpholinoestra-3,5-dien-17-one 17-ethylene ketal, melting at about 151–154° and displaying an optical rotation of −112°.

EXAMPLE 13

To a mixture containing 5 parts of water, 15 parts of methanol, 0.2 part of potassium hydroxide and 1 part of boric acid is added 1 part of 3-pyrrolidinoestra-3,5-dien-17-one 17-dimethyl ketal, and the resulting mixture is heated with stirring in an atmosphere of nitrogen. After about 15 minutes at the reflux temperature, the homogeneous mixture is cooled to room temperature and diluted with approximately 20 parts of water, whereupon crystallization begins. Distillation of the organic solvent under reduced pressure results in complete precipitation of the crude product, which is collected by filtration and washed with water until neutral. That material is dried to afford estr-4-ene-3,17-dione 17-dimethyl ketal, melting at about 128–134°. Further purification is effected by recrystallization from aqueous acetone, thus yielding material melting at about 132–133° and exhibiting an optical rotation of +39.5°.

EXAMPLE 14

The substitution of an equivalent quantity of 3-piperidinoestra-3,5-dien-17-one 17-dimethyl ketal or 3-morpholinoestra-3,5-dien-17-one 17-dimethyl ketal in the procedure of Example 13 results in estr-4-ene-3,17-dione 17-dimethyl ketal, identical with the product of that example.

EXAMPLE 15

When an equivalent quantity of 3-pyrrolidinoestra-3,5-dien-17-one 17-diethyl ketal, 3-piperidinoestra-3,5-dien-17-one 17-diethyl ketal or 3-morpholinoestra-3,5-dien-17-one 17-diethyl ketal is substituted in the procedure of Example 13, there is produced estr-4-ene-3,17-dione 17-diethyl ketal which, after recrystallization from aqueous ethanol, melts at about 92–93° and displays an optical rotation of +188.5°.

EXAMPLE 16

The substitution of an equivalent quantity of 3-pyrrolidinoestra-3,5-dien-17-one 17-ethylene ketal, 3-piperidinoestra-3,5-dien-17-one 17-ethylene ketal or 3-morpholinoestra-3,5-dien-17-one 17-ethylene ketal in the procedure of Example 13 affords estr-4-ene-3,17-dione 17-ethylene ketal which, after recrystallization from aqueous acetone, melts at about 117–118° and exhibits an optical rotation of +17.5°.

EXAMPLE 17

To a mixture containing 450 parts by volume of 1 M boric acid in 3:1 methanol-water is added 30 parts of 3-pyrrolidinoestra-3,5-dien-17-one 17-dimethyl ketal, with stirring. The resulting mixture is heated at the reflux temperature for about 15 minutes, then is cooled to room temperature and diluted with an equal volume of water, whereupon crystillization begins. Distillation of the organic solvent under reduced pressure results in complete precipitation of the crude product, which is collected by filtration and washed on the filter with water until neutral. Drying of that material affords estr-4-ene-3,17-dione 17-dimethyl ketal, identical with the product of Example 13.

EXAMPLE 18

To a mixture containing 83.5 parts by volume of 1 M boric acid and 16.4 parts by volume of 1 M sodium hydroxide in 3:1 methanol-water is added 5 parts of 3-pyrrolidinoestra - 3,5 - dien-17-one 17-dimethyl ketal, with stirring. The resulting mixture is heated at the reflux temperature for about 3 hours, then is cooled to room temperature and diluted with an equal volume of water, whereupon crystillization begins. Distillation of the organic solvent under reduced pressure results in complete precipitation of the crude product, which is collected by filtration and washed with water until neutral. Drying of that material results in estr-4-ene-3,17-dione 17-dimethyl ketal, identical with the product of Example 13.

EXAMPLE 19

A mixture of 18.6 parts of 3-pyrrolidinoestra-3,5-dien-17-one 17-dimethyl ketal, 178 parts of methanol, 75 parts of water and 10.4 parts of methyl borate is heated, with stirring, to the reflux temperature. Solution occurs after about 10 minutes and heating is continued for an additional 10 minute period. The resulting mixture is cooled to room temperature and slowly diluted with about 300 parts of water to induce crystallization of the product. Removal of the organic solvent by distillation at reduced pressure leaves the crude material, which is isolated by filtration, washed on the filter with water, then dried to afford estr-4-ene-3,17-dione 17-dimethyl ketal, identical with the product of Example 13. Purification of the product by recrystallization as described in Example 13 results in the pure product as there described.

EXAMPLE 20

To a mixture of 2700 parts of tetrahydrofuran and 710 parts by volume of 25% diisobutyl aluminum hydride in hexane is added, at −10°, a solution of 100 parts of estr-4-ene-3,17-dione 17-dimethyl ketal in 450 parts of tetrahydrofuran, with stirring, over a period of about 30 minutes. After an additional 30 minute period at that temperature, 50 parts of water followed by 37.5 parts by volume of 20% aqueous sodium hydroxide and 86 parts of water are successively added. The resulting aqueous mixture is stirred for about 1 hour, then is filtered through diatomaceous earth. Evaporation of the filtrate to dryness affords a crystalline mixture of the 3α and 3β isomers of 3-hydroxyestr-4-en-17-one 17-dimethyl ketal. Recrystallization of that material from acetonitrile affords pure 3β-hydroxyestr-4-en-17-one 17-dimethyl ketal, melting at about 150–152° and displaying an optical rotation of +23.5°.

EXAMPLE 21

The substitution of an equivalent quantity of estr-4-ene-3,17-dione 17-diethyl ketal in the procedure of Example 20 results in 3β-hydroxyestr-4-en-17-one 17-diethyl ketal.

EXAMPLE 22

When an equivalent quantity of estr-4-ene-3,17-dione 17-ethylene ketal is substituted in the procedure of Example 20, there is produced 3β-hydroxyestr-4-en-17-one 17-ethylene ketal, melting at about 168–170° and displaying an optical rotation of +2°.

EXAMPLE 23

To a mixture of 50 parts of 3β-hydroxyestr-4-en-17-one 17-dimethyl ketal with 720 parts of methanol is added with stirring a mixture of 105 parts of acetic acid and 100 parts of water. Stirring is continued until the mixture becomes homogeneous, then for about 10 minutes longer. The addition of approximately 1000 parts by volume of 10% aqueous potassium hydroxide results in precipitation of the crude product. That material is extracted into methylene chloride, and the organic extracts are washed with water, dried over anhydrous sodium sulfate and evaporated to dryness. Recrystallization of that crude material from aqueous acetone results in pure 3β-hydroxyestr-4-en-17-one, melting at about 136–137° and displaying an optical rotation of +119.5°.

EXAMPLE 24

To a mixture of 6.9 parts of metallic sodium, 70 parts of liquid ammonia and 36 parts of isopropyl alcohol is added gaseous acetylene until the sodium has completely reacted. The ammonia is then allowed to evaporate in a nitrogen atmosphere, and the resulting residue is dissolved in 54 parts of dimethyl formamide. After cooling of the resulting solution to about 0–5°, gaseous acetylene is added for approximately 30 minutes. At the end of that time, a solution of 13.6 parts of 3β-hydroxyestr-4-en-17-one in 22.5 parts of dimethylformamide and a mixture of 0.13 part of potassium iodide with 13.5 parts of dimethylformamide are successively added. The resulting reaction mixture is stirred for approximately 4 hours, during which time the addition of gaseous acetylene is continued. Approximately 100 parts by volume of 10% aqueous potassium bicarbonate is then added and a stream of nitrogen is passed through the mixture. Dilution with a large volume of water results in precipitation of the product, which is collected by filtration, washed on the filter with water until neutral, then dried to afford 17α-ethynylestr-4-ene-3β,17β-diol, melting at about 149–152°.

What is claimed is:
1. A process for the manufacture of compounds of the formula

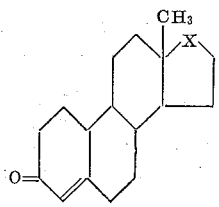

wherein X is a di-(lower alkoxy)methylene or (lower alkylene)dioxymethylene radical, which comprises selectively hydrolyzing the enamine function of a compound of the formula

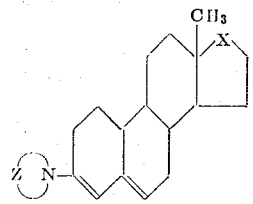

wherein

is the residue of a heterocycloaliphatic amine, in neutral or alkaline medium in the presence of a suitable complexing agent selected from the group consisting of boric acid and alkyl borates.

2. The process according to claim 1 wherein the selective hydrolysis is carried out in the presence of boric acid.

3. The process according to claim 1 wherein the selective hydrolysis is additionally conducted in the presence of heat.

4. A compound of the formula

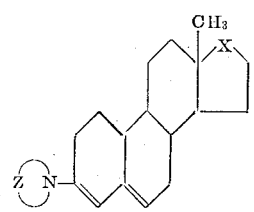

wherein

represents a piperidino or morpholino radical and X is a di-(lower alkoxy)methylene or (lower alkylene)-dioxymethylene radical.

5. 3-piperidinoestra-3,5-dien-17-one 17-dimethyl ketal.
6. 3-piperidinoestra-3,5-dien-17-one 17-ethylene ketal.
7. 3-morpholinoestra-3,5-dien-17-one 17-dimethyl ketal.
8. 3-morpholinoestra-3,5-dien-17-one 17-ethylene ketal.

References Cited

UNITED STATES PATENTS 2,660,586  11/1953  Murray et al.
3,383,384   5/1968  Pappo _____ 260—239.5

LEWIS GOTTS, Primary Examiner

DIANA G. RIVERS, Assistant Examiner

U.S. Cl. X.R.

71—88, 94, 95; 260—239.55, 397.4, 397.5